(12) United States Patent
Fredinburg et al.

(10) Patent No.: US 8,898,800 B1
(45) Date of Patent: Nov. 25, 2014

(54) MECHANISM FOR ESTABLISHING THE TRUST TREE

(71) Applicant: Google Inc., Mountain View, CA (US)

(72) Inventors: Dan Fredinburg, San Francisco, CA (US); Rohit Khare, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/844,613

(22) Filed: Mar. 15, 2013

(51) Int. Cl.
*G06F 11/00* (2006.01)
*G06F 21/62* (2013.01)

(52) U.S. Cl.
CPC .................................. *G06F 21/6245* (2013.01)
USPC ............................................................ 726/26

(58) Field of Classification Search
USPC ........................ 726/26, 30; 713/176, 179, 180
See application file for complete search history.

(56) References Cited

U.S. PATENT DOCUMENTS

| | | | |
|---|---|---|---|
| 8,024,306 B2 * | 9/2011 | Palliyil et al. | 707/698 |
| 2003/0110384 A1 * | 6/2003 | Carro | 713/181 |
| 2005/0055437 A1 * | 3/2005 | Burckart et al. | 709/224 |
| 2007/0041371 A1 * | 2/2007 | Hattori | 370/352 |
| 2012/0039453 A1 * | 2/2012 | Maenpaa | 379/188 |
| 2014/0173115 A1 * | 6/2014 | Varney et al. | 709/226 |

* cited by examiner

*Primary Examiner* — Beemnet Dada
(74) *Attorney, Agent, or Firm* — Procopio, Cory & Hargreaves & Savitch LLP

(57) ABSTRACT

Example implementations described herein are directed to a trust tree that allows third party applications to operate on sensitive user data within the confines of a protected environment. The environment storing the sensitive user data prevents the third party application from receiving sensitive user data through use of an overlay, while preserving the function of the third party application. This permits the value of the application to be provided to a user without the risk of the application violating the user's privacy.

12 Claims, 6 Drawing Sheets

MECHANISM FOR ESTABLISHING THE TRUST TREE

BACKGROUND

1. Field

Aspects of the example implementations relate generally to data management, and more specifically, to managing access and display protocols for sensitive data.

2. Background

Users often utilize "third party" applications and grant permission to sensitive user data (e.g., personal user information such as name, address, phone number, etc.) based on difficult to understand, or noisy permission negotiations. This may result in various applications gaining access to sensitive data that is not needed to provide the promised service to the user. The situation can be further complicated by applications that request a class of user data (e.g., need name to greet user), but then use the user data for nefarious or alternate purposes (e.g., sell name to marketing list).

In an example, the user utilizes an application to conduct an online interaction (e.g., blog comment, liking a social media post, posting a photo, etc.), which is tagged with user information. The online interaction may be hyperlinked back to the user's social media or other account. A web crawler may traverse the online interaction back to the user's account and thereby extract personal information that the user may not have intended to reveal to the application. Further, the application may also extract sensitive data from the user's account from the online interaction.

Consider the related art example of FIG. 1, wherein a user is running a third party application 101 within a social media website in a web browser 100. Another user, "Abel Smith", initiates an online interaction 102 within the third party application, and inadvertently reveals his account address in a hyperlink 103 associated with his name (e.g., the third party application requiring the information from "Abel Smith" without the information being required to run the application, mishandling of permissions, etc.), such that when a user hovers over Abel Smith's name, his account page is revealed.

The third party application may then traverse Abel Smith's webpage and potentially extract sensitive user data about Abel Smith that was not intended through the online interaction. Further, if the online interaction is generally made public, third party web crawlers may crawl Abel Smith's account page and also extract sensitive user data that was not intended to be made public through the online interaction, or data mining applications can obtain information based on the online interaction (e.g., average age of friends, etc.).

SUMMARY

Aspects of the example implementations may include a server, which involves a hashing unit configured to provide one or more hashes for information associated with a user to one or more entities; an authentication unit configured to verify a requesting entity that provides at least one of the one or more hashes for information associated with the user; and a decoding unit configured to provide the information associated with the user and corresponding to the at least one of the one or more hashes, for display in a device that runs an application associated with a verified requesting entity.

Aspects may further include a computer readable storage medium, storing instructions for executing a process. The instructions may include providing one or more hashes for information associated with a user to one or more entities; verifying a requesting entity that provides at least one of the one or more hashes for information associated with the user; and providing the information associated with the user corresponding to the one or more hashes for display in a device that runs an application associated with a verified requesting entity.

Aspects of the present application may further include a method, which may involve providing one or more hashes for information associated with a user to one or more entities; verifying a requesting entity that provides at least one of the one or more hashes for information associated with the user; and providing the information associated with the user corresponding to the one or more hashes for display in a device that runs an application associated with a verified requesting entity.

DETAILED DESCRIPTION

Figure 1:
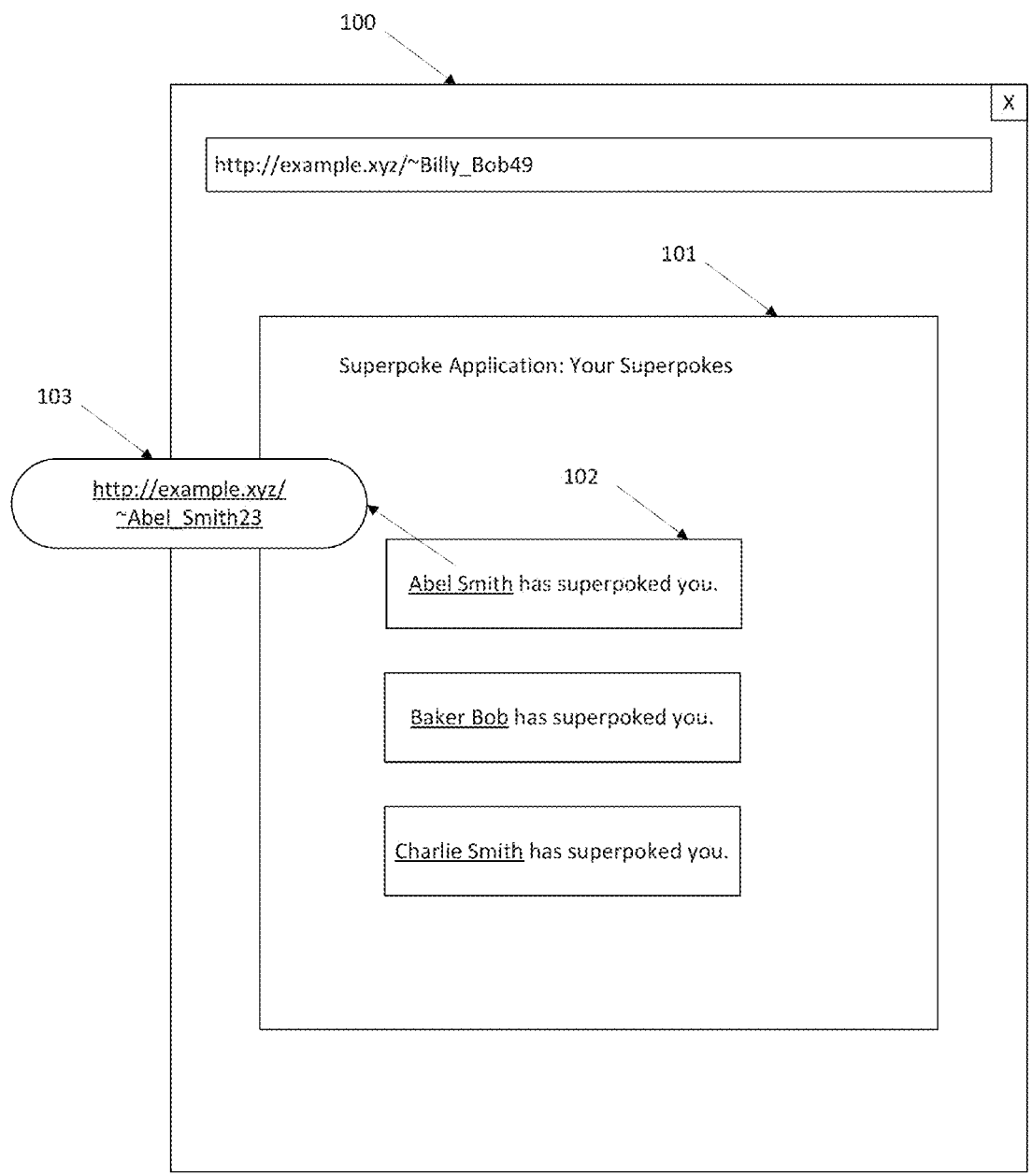
FIG. 1 illustrates a related art example of an online interaction within a web browser.

In example implementations, a trust tree is utilized to allow third party applications to operate on sensitive user data within the confines of a protected environment. The environment prevents the ability to export the sensitive data to an external server or device.

Devices that invoke the application which contain the online interactions interact with a server, which may operate an overlay on the application to display parts of the user data (e.g., user name, etc.) through the use of hashes. The hashes can also be implemented such that the sensitive user data is parceled into individual subsets if only certain sensitive user data is required to execute the application (e.g., a hash specifically for user name, a hash for user address, etc.).

Though example implementations described herein use hashes in the examples, the use of hashes is not intended to be limiting to hashes, but rather to serve as an example of utilizing obfuscation in place of sensitive user information, and can be replaced by other methods of obfuscation or cryptographic functions (e.g., encryption of the user data, encryption keys, etc.), depending on the desired implementation of one of ordinary skill in the art.

Unique hashes can be provided to each application for the same sensitive user information, such that each third party application is given a different hash (e.g., such that the hash is unique to both the user data and to a particular third party application). Multiple third party applications would thereby receive different hashes for the same sensitive user data, which reduces the chances of a particular hash being linked to a particular user data. Hashes can also be based on a user identifier (e.g., user account name) and the third party application, wherein the overlay can use the hash to authenticate and receive the sensitive user data through the overlay.

Applications that are managed by the server and therefore fall within the trust tree, (e.g., social media sites, video sharing sites, search engines, etc.), can thereby manage the sensitive information through the use of overlays to prevent the actual sensitive user data from being leaked to a third party application or to a web crawler or visitor to a website. For example, if a third application requests a name and a website for display within an application operating under the trust tree, the server can provide an overlay for the application operating under the trust tree for use in displaying the name and a website.

Further, the server can make determinations (e.g., through search engine, through request from the third party application etc.), with respect to one or more application requirements of the third party application, and then parcel sensitive user data accordingly. For example, if the third party application only requires the name of the user to operate the application, and further requests the link to associate the name to the account page (not needed for the operation of the application), then the server can parcel the sensitive user data and provide a hash for the user name, and not provide any information for the web page.

Instead, the server may modify a hyperlink to the account page by using the provided hash through the overlay, or by other methods depending on the desired implementation. In other example implementations, the hyperlink may be blank or erased (e.g., the name is rendered un-clickable by the overlay, etc.), which can be determined, for example, by policy settings of the server or of the particular user account (e.g., show only to friends, show only to user devices, etc.)

When an overlay is invoked by a user device operating on an application within the trust tree, the overlay can decrypt the hashes in real time for display. An authentication process can also be utilized to determine if the sensitive data should be displayed, based on, for example, policy settings of the server or of the particular user account. For example, the overlay may request the server for decryption, wherein the server can verify the entity running the overlay, and the hash being provided, and compare the entity and the hash to a policy setting (e.g., of the server, of the user account, etc.). If the authentication is valid, then the sensitive data can be displayed through the overlay without conveying the information to the third party application.

Further, applications and websites can be configured to enable or disable the overlay. This can ensure, for example, that the overlay is not employed if a web crawler attempts to access a cached version of a website within the trust tree through a search engine. The applications and websites within the trust tree can further be configured to have the overlay enabled or disabled, depending on the entity accessing the application or website and the policy setting of the user account or the server.

Figure 2A:
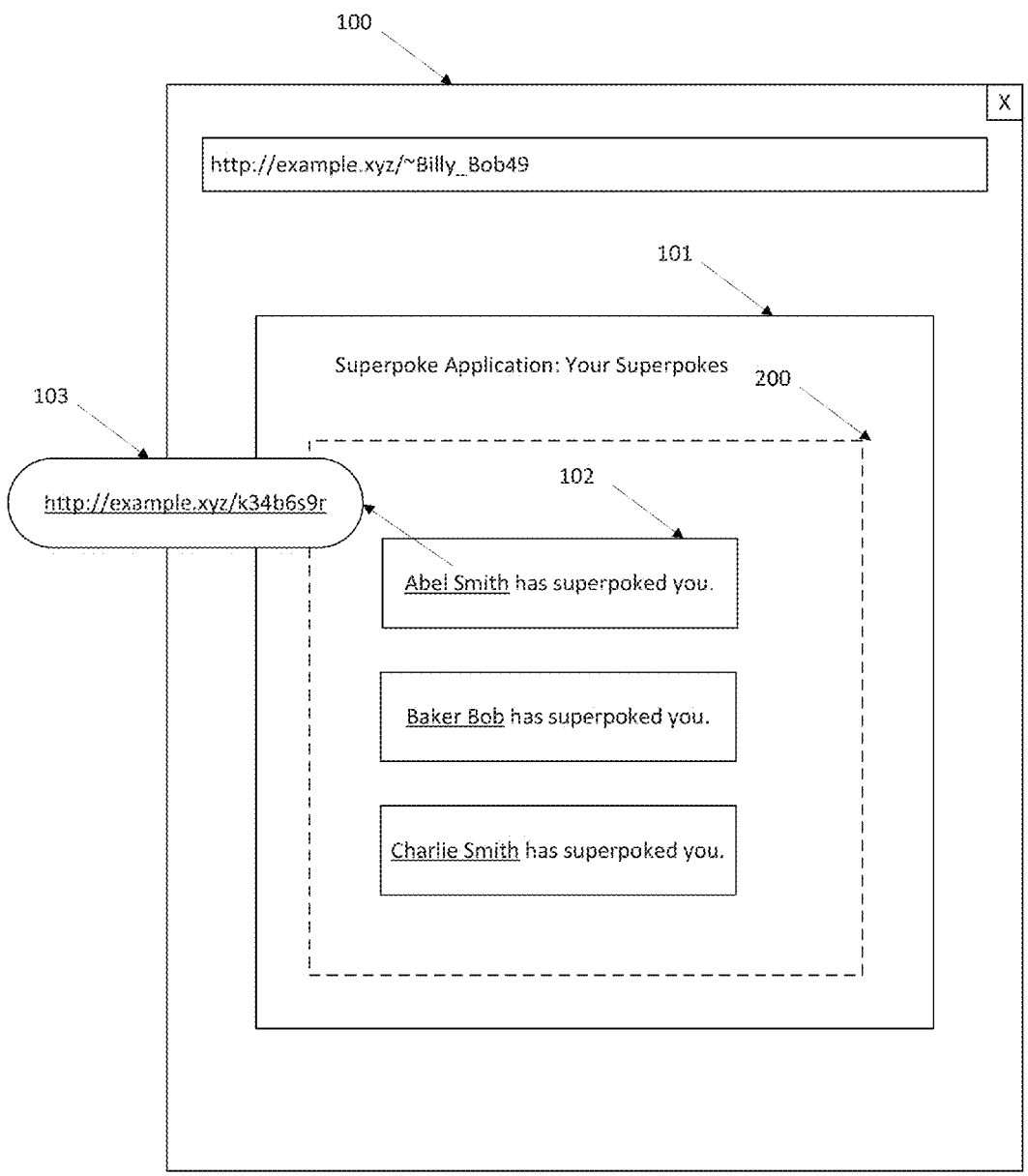
FIGS. 2(a) and 2(b) illustrate examples of an online interaction within a web browser, in accordance with an example implementation.
Figure 2B:
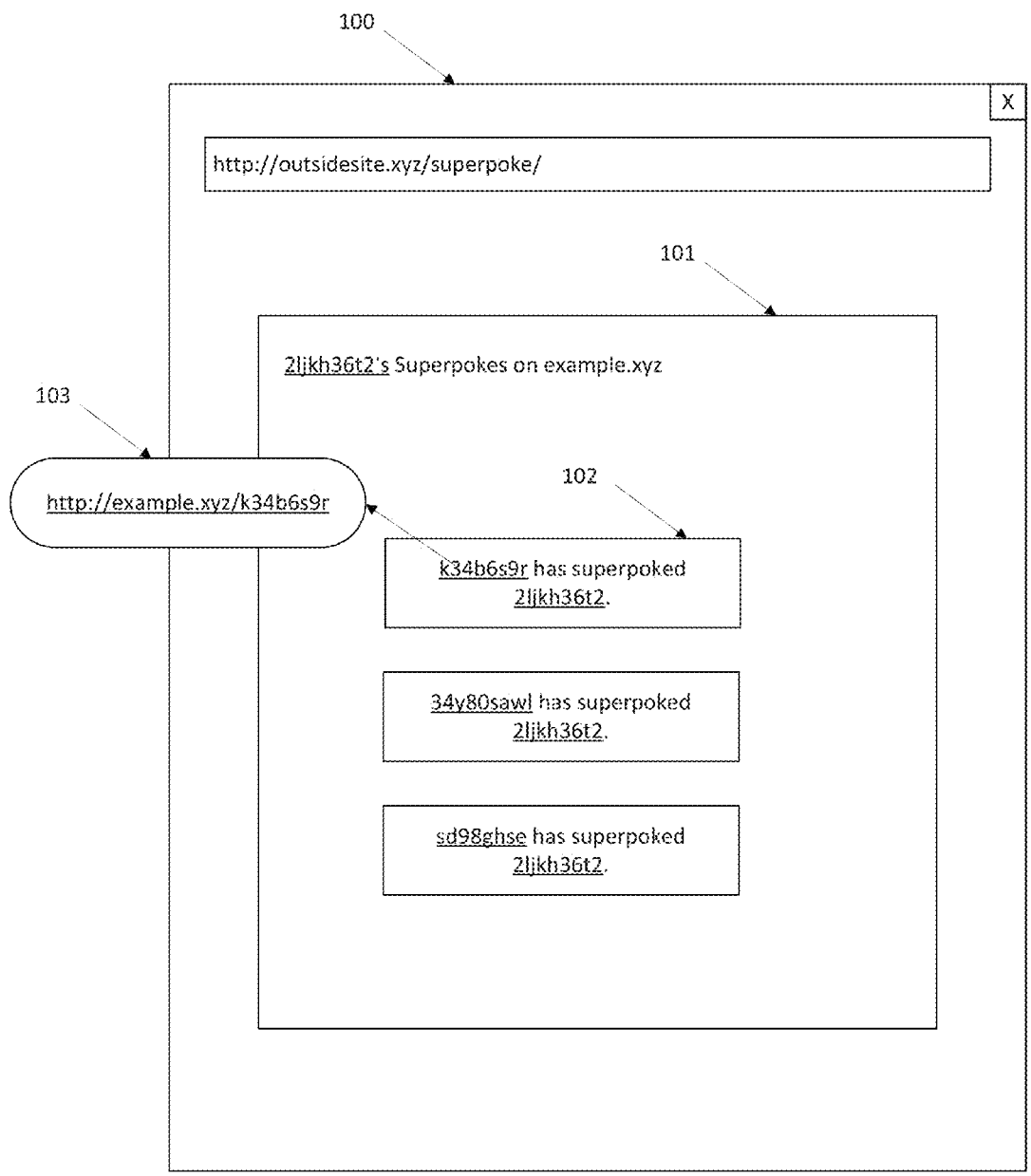

FIGS. 2(a) and 2(b) illustrate examples of an online interaction within a web browser, in accordance with an example implementation. In the example of FIG. 2(a), the social media site generates a unique hash identifier "k34b6s9r" for user account "Abel Smith" for use in the third party application 101. When a user within the trust tree (e.g., applications related to the entity managing the sensitive user data) is logged on and viewing the third party application 101, an overlay 200 is employed to translate the hash in real time to the user name "Abel Smith" for online interaction 102. The overlay can be, for example, an iframe that employs scripting language to translate the hashes in real-time to the proper name, or can be implemented in other ways, depending on the desired implementation.

In the example of FIG. 2(a), the account address 103, can be modified by using the hash in place of the actual account name (e.g., if the server determines that the information is not necessary for execution of the application, etc.), which points to a non-existent site. When the user clicks the link to the account address 103 through the overlay 200, the overlay may translate that link into the actual account address link and forward the user to the correct address. In other example implementations, depending on the user settings or other desired implementation, a click of the link may forward the user to the non-existent address instead.

In this manner, the third party application 101 only receives hash information and not the actual sensitive user data, which is not revealed unless an overlay is employed by a user or application within the trust tree. In other example implementations, the overlay can authenticate the hash and the device or application attempting to obtain the sensitive user data, and provide the sensitive data for display though the overlay if authenticated, or display the same results as that of FIG. 2(b) if the authentication fails. In other example implementations, the results can also be left un-displayed, as if the online interaction did not take place.

In the example of FIG. 2(b), the third party application is accessed outside of the trust tree (e.g., a cache site, the third party application site, etc.) by a web crawler. However, as shown in the example of FIG. 2(b), because only hashed information was provided to the third party application, the web crawler can only view the hashes, and cannot view or obtain the sensitive user data. Similarly, in an implementation where authentication of the hashes and the requesting device/application is utilized, the same result can occur if authentication fails. Such an implementation not only prevents leakage of sensitive data to outside third parties, but also may assist in preventing data mining, as only hashes are displayed to data mining programs, and not actual sensitive user data.

Figure 3:
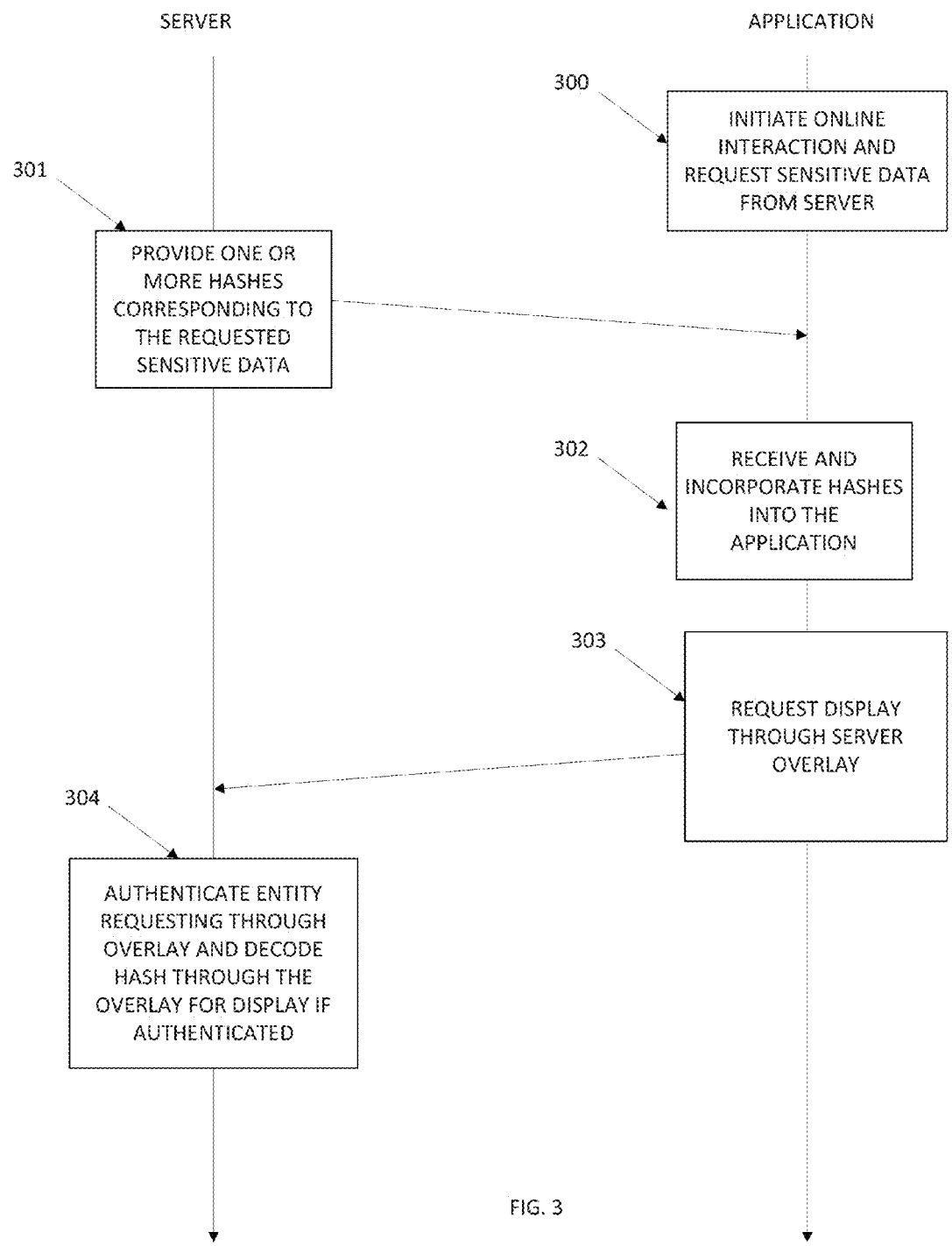
FIG. 3 illustrates an example of a flow diagram between a server and an application, in accordance with an example implementation.

FIG. 3 illustrates an example flow diagram between an application and a server, in accordance with an example implementation. The third party application may be invoked by one or more devices. At 300, the application conducts an online interaction that utilizes sensitive data and requests the server for the sensitive data. At 301, the server provides one or more hashes to the application corresponding to the requested sensitive data to the application. The hashes can be made unique by basing them on both the sensitive data and the third party application requesting the information. At 302, the application then utilizes the one or more hashes for display.

Upon invocation by a device running the application, at 303, the hash is sent back to the server by a server provided overlay on the third party application, which authenticates the received hash and the entity sending the request at 304. The server then decrypts the hash for display on the device (e.g., in real time through the overlay as the application is running) if the authentication is valid, and the resulting data is displayed.

Example Processing Environment

Figure 4:
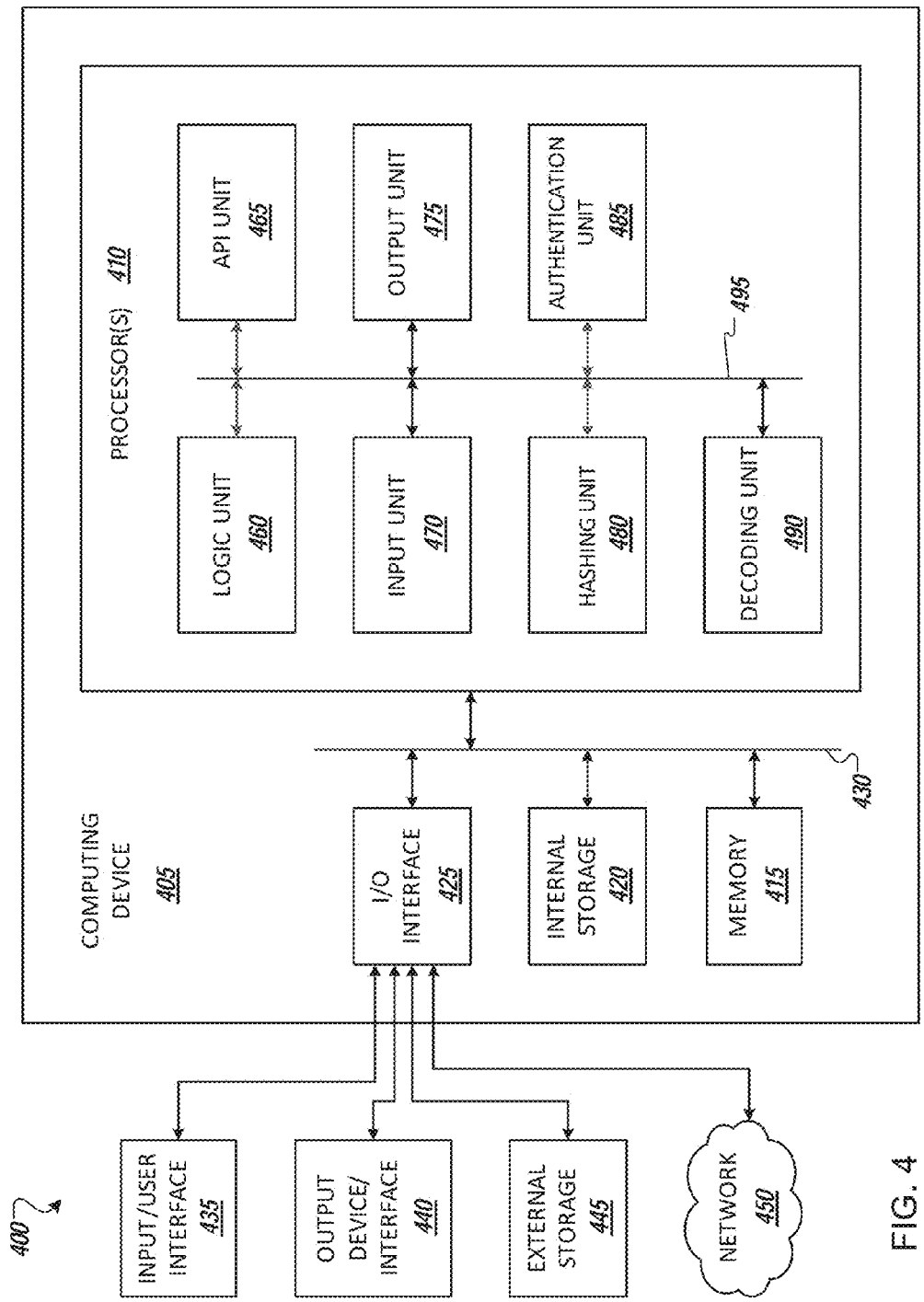
FIG. 4 shows an example computing environment with an example computing device suitable for use in some example implementations.

FIG. 4 shows an example computing environment with an example computing device suitable for use in some example implementations. Computing device 405 in computing environment 400 can include one or more processing units, cores, or processors 410, memory 415 (e.g., RAM, ROM, and/or the like), internal storage 420 (e.g., magnetic, optical, solid state storage, and/or organic), and/or I/O interface 425, any of which can be coupled on a communication mechanism or bus 430 for communicating information or embedded in the computing device 405.

Computing device 405 can be communicatively coupled to input/user interface 435 and output device/interface 440. Either one or both of input/user interface 435 and output device/interface 440 can be a wired or wireless interface and can be detachable. Input/user interface 435 may include any device, component, sensor, or interface, physical or virtual, that can be used to provide input (e.g., buttons, touch-screen interface, keyboard, a pointing/cursor control, microphone, camera, braille, motion sensor, optical reader, and/or the like).

Output device/interface 440 may include a display, television, monitor, printer, speaker, braille, or the like. In some example implementations, input/user interface 425 and output device/interface 440 can be embedded with or physically coupled to the computing device 405. In other example implementations, other computing devices may function as or provide the functions of input/user interface 435 and output device/interface 440 for a computing device 405.

Examples of computing device 405 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, servers, and the like).

Computing device 405 can be communicatively coupled (e.g., via I/O interface 425) to external storage 445 and network 450 for communicating with any number of networked components, devices, and systems, including one or more computing devices of the same or different configuration. Computing device 405 or any connected computing device can be functioning as, providing services of, or referred to as a server, client, thin server, general machine, special-purpose machine, or another label.

I/O interface 425 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 400. Network 450 can be any network or combination of networks (e.g., the Internet, local area network, wide area network, a telephonic network, a cellular network, satellite network, and the like).

Computing device 405 can use and/or communicate using computer-usable or computer-readable media, including signal media and storage media. Signal media include transmission media (e.g., metal cables, fiber optics), signals, carrier waves, and the like. Storage media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 405 can be used to implement techniques, methods, applications, processes, or computer-executable instructions in some example computing environments. Computer-executable instructions can be retrieved from signal media, and stored on and retrieved from storage media, such as computer readable storage mediums (e.g., flash memory, random access memory, hard disk drives, etc.). The executable instructions can originate from one or more of any programming, scripting, and machine languages (e.g., C, C++, C#, Java, Visual Basic, Python, Perl, JavaScript, and others).

Processor(s) 410 can execute under any operating system (OS) (not shown), in a native or virtual environment. One or more applications can be deployed that include logic unit 460, application programming interface (API) unit 465, input unit 470, output unit 475, hashing unit 480, authentication unit 485, decoding unit 490, and inter-unit communication mechanism 495 for the different units to communicate with each other, with the OS, and with other applications (not shown). For example, hashing unit 480, authentication unit 485, and decoding unit 490 may implement one or more processes as shown in FIGS. 2(a), 2(b), and 3, depending on the implementation (e.g., as a server). The described units and elements can be varied in design, function, configuration, or implementation and are not limited to the descriptions provided.

In some example implementations, when information or an execution instruction is received by API unit 465, it may be communicated to one or more other units (e.g., logic unit 460, input unit 470, output unit 475, hashing unit 480, authentication unit 485, and decoding unit 490). For example, hashing unit 480 may be configured to provide one or more hashes for information associated with a user to one or more entities, and use the API unit 465 to communicate with the authentication unit 485 to authenticate the hashes and the requesting entity, as described in the above example implementations. Decoding unit 490 may, via API unit 465, interact with the hashing unit 480 to decode the hash for display for use in an overlay.

In some instances, logic unit 460 may be configured to control the information flow among the units and direct the services provided by API unit 465, input unit 470, output unit 475, authentication unit 480, recovery unit 485, and random number generator unit 490 in some example implementations described above. For example, the flow of one or more processes or implementations may be controlled by logic unit 460 alone or in conjunction with API unit 465.

Example Processing Environment

Figure 5:
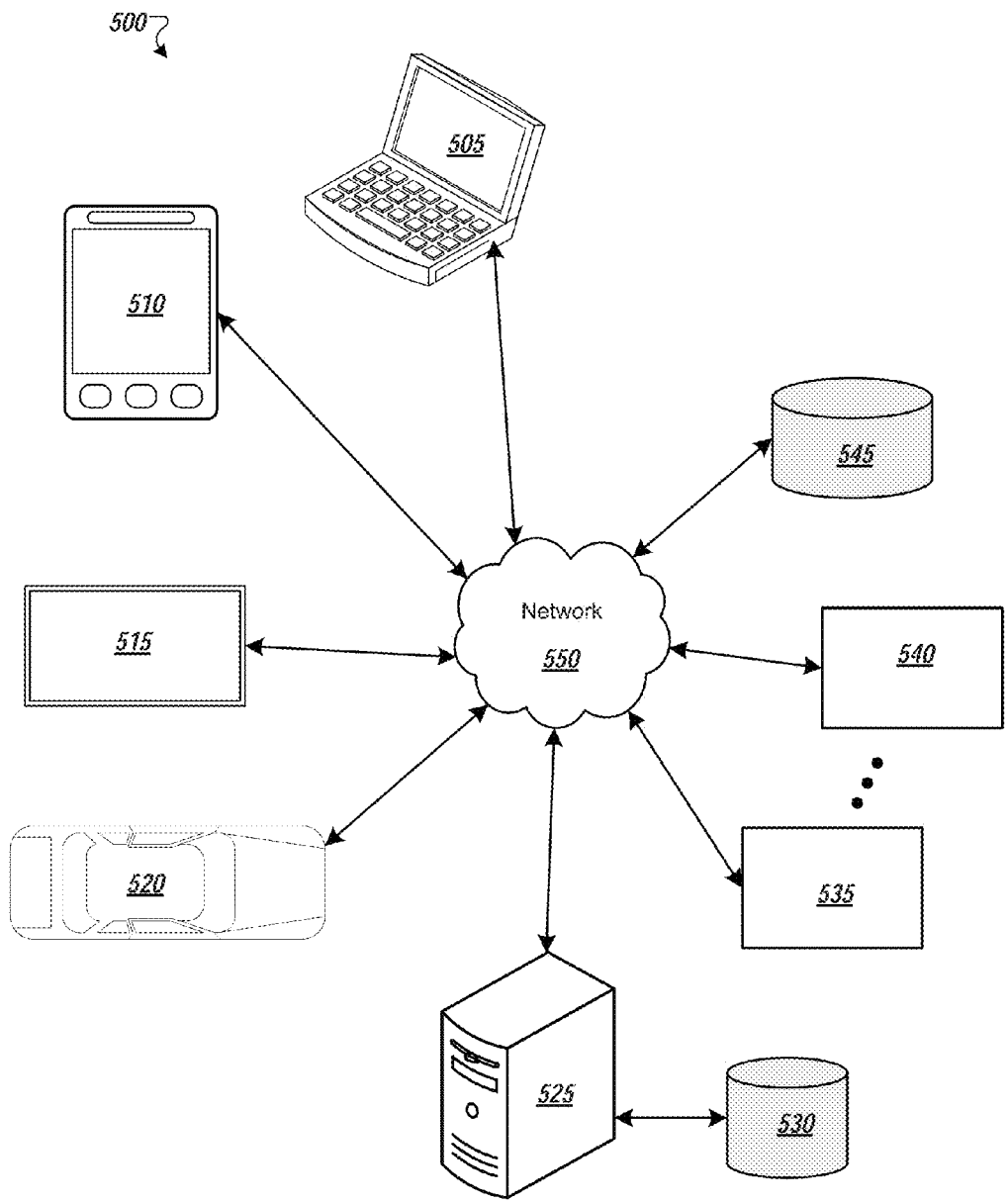
FIG. 5 shows an example online environment in which some example embodiments may be implemented.

FIG. 5 shows an example online environment in which some example embodiments may be implemented. Environment 500 includes devices 505-545, each is communicatively connected to at least one other device via, for example, network 550. Some devices may be communicatively connected to one or more storage devices 530 and 545 (e.g., via device 425).

An example of one or more devices 505-550 may be computing device 405 described above in FIG. 4. Devices 505-550 may include, but are not limited to, a computer 525 (e.g., personal or commercial), a device associated with a vehicle 520, a mobile device 510 (e.g., smartphone), a television 515, a mobile computer 505, a server computer 550, computing devices 535-540, storage devices 530, 545. Any of devices 505-550 may access one or more services from and/or provide one or more services to one or more devices shown in environment 400 and/or devices not shown in environment 500.

A user may control a device, as explained above, to implement the example implementations, via network 550. Information associated with the example implementations may be stored at storage device 530 or 545, respectively, for example.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user.

In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A server, comprising:
   a hashing unit configured to provide one or more hashes for information associated with a user to one or more entities;
   an authentication unit configured to verify a requesting entity that provides at least one of the one or more hashes for information associated with the user; and
   a decoding unit configured to provide the information associated with the user and corresponding to the at least one of the one or more hashes, for display in a device that runs an application associated with a verified requesting entity, the decoding unit comprising an overlay on an application associated with the verified requesting entity, wherein the overlay is configured to modify a hyperlink associated with the displayed information based on the one or more hashes.

2. The server of claim 1, wherein the decoding unit is configured to use the overlay to display the information associated with the user and corresponding to the at least one of the one or more hashes to the device.

3. The server of claim 1, wherein the hashing unit is configured to provide differing hashes to the one or more hashes for a same subset of the information associated with the user.

4. The server of claim 1, wherein the hashing unit is configured to provide differing hashes to the one or more hashes for a same subset of the information associated with the user.

5. A non-transitory computer readable storage medium, storing instructions for executing a process, the instructions comprising:
   providing one or more hashes for information associated with a user to one or more entities;
   verifying a requesting entity that provides at least one of the one or more hashes for information associated with the user; and
   providing the information associated with the user corresponding to the one or more hashes for display in a device that runs an application associated with a verified requesting entity, the providing comprising providing an overlay on an application associated with the verified requesting entity, wherein the providing the overlay comprises using the overlay to modify an associated hyperlink to the displayed information based on the one or more hashes.

6. The non-transitory computer readable storage medium of claim 5, wherein the providing the information associated with the user and corresponding to the at least one of the one or more hashes to the device for the verified requesting entity comprises using the overlay to display the information associated with the user to the device.

7. The non-transitory computer readable storage medium of claim 5, wherein the instructions further comprise determining a subset of the information associated with the user to the application based on one or more application execution requirements.

8. The non-transitory computer readable storage medium of claim 5, wherein the instructions further comprise providing differing hashes to the one or more hashes for a same subset of the information associated with the user.

9. A method, comprising:
   providing one or more hashes for information associated with a user to one or more entities;
   verifying a requesting entity that provides at least one of the one or more hashes for information associated with the user; and
   providing the information associated with the user corresponding to the one or more hashes for display in a device that runs an application associated with a verified requesting entity, the providing comprising providing an overlay on an application associated with the verified requesting entity, wherein the providing the overlay comprises using the overlay to modify an associated hyperlink to the displayed information based on the one or more hashes.

10. The method of claim 9, wherein the providing the information associated with the user and corresponding to the at least one of the one or more hashes to the device for the verified requesting entity comprises using the overlay to display the information associated with the user to the device.

11. The method of claim 9, wherein the instructions further comprise determining a subset of the information associated with the user to the application based on one or more application execution requirements.

12. The method of claim 9, wherein the instructions further comprise providing differing hashes to the one or more hashes for a same subset of the information associated with the user.

* * * * *